(12) United States Patent
Zeng et al.

(10) Patent No.: US 12,523,924 B2
(45) Date of Patent: Jan. 13, 2026

(54) VEHICLE-MOUNTED CAMERA CRANE

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 638 days.

(21) Appl. No.: 17/942,939

(22) Filed: Sep. 12, 2022

(65) Prior Publication Data

US 2024/0085767 A1 Mar. 14, 2024

(51) Int. Cl.
| | | |
|---|---|---|
| *G03B 17/56* | (2021.01) | |
| *B60R 11/04* | (2006.01) | |
| *B66C 23/36* | (2006.01) | |
| *F16M 11/00* | (2006.01) | |
| *B60R 11/00* | (2006.01) | |

(52) U.S. Cl.
CPC ............ *G03B 17/561* (2013.01); *B60R 11/04* (2013.01); *B66C 23/36* (2013.01); *F16M 11/00* (2013.01); *B60R 2011/004* (2013.01); *B60R 2011/0092* (2013.01)

(58) Field of Classification Search
CPC ...... G03B 17/561; G03B 29/00; G03B 17/56; G03B 17/568; B60R 11/04; B60R 2011/004; B60R 2011/0092; B60R 2011/0056; B60R 2011/0084; B60R 2011/0085; B60R 2011/0042; B66C 23/36; F16M 11/00; F16M 11/08; F16M 11/12; F16M 11/2014

USPC ...... 248/176.1, 176.3, 663, 481, 482, 181.1, 248/181.2, 288.31, 206.2, 349.1; 396/419, 428
See application file for complete search history.

(56) References Cited

U.S. PATENT DOCUMENTS

| | | | | |
|---|---|---|---|---|
| 2,668,682 A | * | 2/1954 | Dalton | F16M 11/34 396/428 |
| 4,615,597 A | * | 10/1986 | Burriss | F16M 11/048 396/428 |
| 5,039,050 A | * | 8/1991 | Eidschun | B60R 11/04 396/419 |

(Continued)

FOREIGN PATENT DOCUMENTS

| | | |
|---|---|---|
| CN | 204009325 U | 12/2014 |
| CN | 106195549 A | 12/2016 |

(Continued)

*Primary Examiner* — William D Hutton, Jr.
(74) *Attorney, Agent, or Firm* — LOZA & LOZA, LLP; Derek Yeung

(57) ABSTRACT

A vehicle-mounted rocker arm without counterweight, includes a heading shaft, a pitching shaft part, an arm body, a damping arm, and a housing. The pitching shaft part includes a main structure frame, a rocker arm, a servo electric cylinder, and a gas spring. The gas spring can balance the weight loaded by the arm body so that the force exerted by the servo electric cylinder during stretching and contracting is balanced, so as to achieve the effect of balancing the longitudinal center of gravity of the arm body without using a counterweight. The vehicle-mounted rocker arm without counterweight is further characterized in that pitching shaft part and the rotating shaft are independent modules, and can be dismounted and installed separately. The vehicle-mounted rocker arm without counterweight is further characterized in that the arm body part has a truss type quick butting structure.

9 Claims, 18 Drawing Sheets

(56) References Cited

U.S. PATENT DOCUMENTS

| | | | | |
|---|---|---|---|---|
| 5,086,206 A * | 2/1992 | Hansen | ..................... | B60S 5/00 |
| | | | | 219/136 |
| 5,835,808 A * | 11/1998 | Parker | ..................... | B60R 11/04 |
| | | | | 396/419 |
| 7,101,045 B2 * | 9/2006 | Romanoff | .......... | F16M 11/2014 |
| | | | | 396/428 |
| 7,137,747 B2 * | 11/2006 | Chapman | ............... | F16M 11/42 |
| | | | | 396/428 |
| 7,311,452 B2 * | 12/2007 | Chapman | ............... | G03B 17/02 |
| | | | | 396/428 |
| 7,642,741 B2 * | 1/2010 | Sidman | .................. | G01C 21/18 |
| | | | | 318/648 |
| 8,077,212 B2 * | 12/2011 | Chapman | ............... | B66F 11/048 |
| | | | | 396/419 |
| 8,550,632 B2 * | 10/2013 | Chapman | ............... | F16M 11/28 |
| | | | | 396/428 |
| 8,811,812 B1 * | 8/2014 | Lawler | ................. | G03B 17/561 |
| | | | | 396/419 |
| 8,956,068 B2 * | 2/2015 | Mekid | .................. | F16M 11/043 |
| | | | | 248/176.1 |
| 10,479,288 B2 * | 11/2019 | Nelson | .................. | F16M 11/16 |
| 11,422,437 B2 * | 8/2022 | Chapman | ............ | G03B 17/561 |
| 2008/0006746 A1 * | 1/2008 | Volochine | .............. | F16M 11/28 |
| | | | | 248/169 |
| 2012/0070143 A1 * | 3/2012 | Chapman | ............ | B66F 11/048 |
| | | | | 396/428 |
| 2015/0210521 A1 * | 7/2015 | Valles Navarro | ....... | B66F 13/00 |
| | | | | 248/123.2 |
| 2018/0037172 A1 * | 2/2018 | Nelson | ............... | F16M 11/2092 |
| 2020/0169650 A1 * | 5/2020 | Fellinger | ............ | G03B 17/561 |
| 2021/0286237 A1 * | 9/2021 | Zeng | ..................... | F16F 15/06 |
| 2024/0085767 A1 * | 3/2024 | Zeng | ..................... | F16M 11/00 |
| 2024/0181971 A1 * | 6/2024 | Zeng | ..................... | B66C 23/36 |

FOREIGN PATENT DOCUMENTS

| | | | | |
|---|---|---|---|---|
| WO | WO-2015107530 A1 * | 7/2015 | ............ | H04N 23/60 |
| WO | WO-2017164781 A1 * | 9/2017 | ............ | B66C 23/80 |

\* cited by examiner

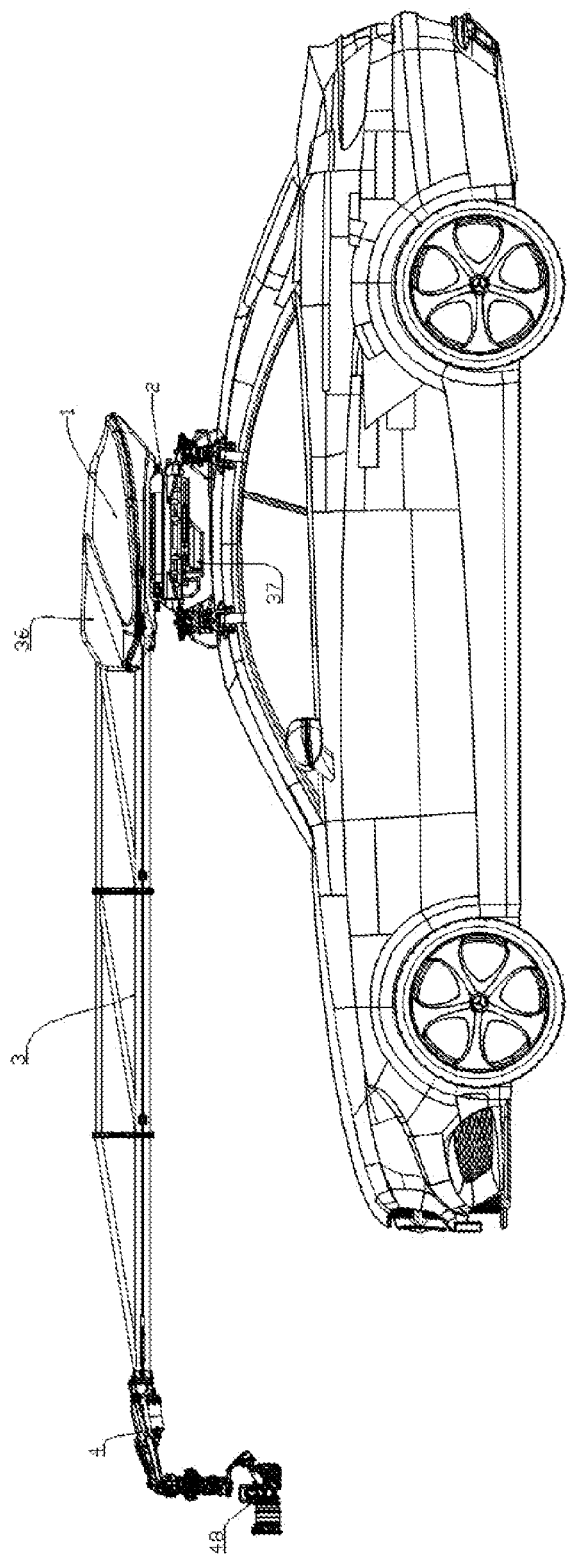

VEHICLE-MOUNTED CAMERA CRANE

TECHNICAL FIELD

The present disclosure relates to the technical field of photographic equipment, and in particular, to a vehicle-mounted camera crane without a counterweight.

INTRODUCTION

A vehicle-mounted camera crane is a camera crane or rocker arm that may be installed on a car or ship. In this disclosure, the terms camera crane and rocker arm may be used interchangeably. It is used for film and television equipment for shooting high-speed moving objects in movies or advertisements. It may remotely control the rotation and pitching motions of the arm body by wire or wireless. However, the existing vehicle-mounted rocker arm has the following problems:

1. A lever-type vehicle-mounted rocker arm needs to be mounted with a counterweight to balance the longitudinal center of gravity of the rocker arm. When a tripod head and a camera are mounted at the front end of the rocker arm, a counterweight needs to be mounted at the rear to balance the longitudinal center of gravity of the rocker arm. The assembly process is cumbersome, and the transportation is inconvenient. When the lever-type vehicle-mounted rocker arm is performing rotating and pitching motions, the counterweight at the rear end of the rocker arm is prone to collide with the surrounding obstacles. The lever-type vehicle-mounted rocker arm is installed behind the roof of the vehicle, which leads to the overall height of the vehicle being too high, and the vehicle is affected by the environmental height limit when driving.
2. The rotating shaft and the pitching shaft are integrated and inseparable structures, and the weight is too heavy, so the installation to the roof needs the assistance of a lifting device, which is inconvenient.
3. The arm body includes a main arm tube, an auxiliary arm tube, a steel wire rope strut, and other parts spliced together, and the assembly steps are cumbersome.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In order to solve the above problems, the primary objective of the present invention is to provide a vehicle-mounted rocker arm without a counterweight. The pitching shaft part of the vehicle-mounted rocker arm is provided with a servo electric cylinder and a gas spring, and the weight loaded on the front end of the arm body is balanced by the gas spring, so that no counterweight is required. Through the horizontal arrangement of the servo electric cylinder and the gas spring, the height of the rocker arm is not affected by the length of the servo electric cylinder and the gas spring itself, so as to achieve the overall height of the compression device and achieve the effect of flat design.

Another objective of the present invention is to provide a detachable device, which is designed in a split manner by a pitching shaft and a rotating shaft. When the device is installed on the roof, the rotating shaft and the pitching shaft may be installed in two parts, so that the weight of a single lift during installation can be reduced, and a lifting device is not required to assist hoisting.

Another objective of the present invention is to provide a quick-detachable arm body structure, which has a single-row truss structure, thereby achieving the quick disassembly and assembly of the whole vehicle-mounted rocker arm.

To achieve the above objectives, the technical schemes of the present invention are as follows.

The present invention relates to a vehicle-mounted rocker arm without counterweight, which includes a heading shaft, a pitching shaft, an arm body, a shock absorbing arm, and a housing, wherein the pitching shaft part includes a main structure frame, a rocker arm, a servo electric cylinder, and a gas spring. The pitching motion of the arm body is driven by the servo electric cylinder and assisted by the gas spring. One end of the servo electric cylinder is connected to the rocker arm, the other end is connected to the main structure frame, and the arm body is connected to the rocker arm. By pushing and pulling the rocker arm, the servo electric cylinder converts the linear motion into the rotary motion and drives the arm body to perform the pitching motion. The servo electric cylinder has the characteristics of high precision, high rigidity, and certain mechanical self-locking force, so it can bear a large impact force. The gas springs are located on both sides of the servo electric cylinder, one end of each of the gas springs is connected to the rocker arm, and the other end is connected to the main frame structure. The gas springs have the characteristics of small volume and lightweight, and the weight loaded on the rocker arm can be balanced by the gas springs, so that the force exerted by the stretching and contracting of the servo electric cylinder is balanced, and the stress of the servo electric cylinder is reduced.

Further, the pitching shaft part and the rotating shaft part are designed in a split way, and the rotating shaft part includes a servo motor, a reducer, a slip ring, a turntable bearing, a gearwheel, a pinion, a pinch roller, and a timing belt. The gearwheel is provided with a butting bolt with the pitching shaft, the pitching shaft is provided with a positioning hole butted with the rotating shaft, and the two parts are connected into a whole by a knob nut. A quick butting plug is provided between the pitching shaft and the rotating shaft to achieve the circuit communication between the pitching shaft and the rotating shaft.

Further, the arm body part is of quick-detachable design, and the arm includes a main arm rod, an auxiliary arm rod, an inclined strut, and an arm butting plate. The main arm rod, the auxiliary arm rod, and the inclined strut form a single-row truss structure through arm butting pieces (the truss structure has the characteristics of strong rigidity, and the whole structure will not be deformed if no one or more members are deformed when subjected to an external force) and the arm butting plate is divided into a through hole end pair and a threaded hole end. The arm butting plate is divided into a through hole end pair and a threaded hole end. The arm butting plate at the through hole end is provided with a positioning pin, which may be hooked and positioned with the arm body butting plate at the threaded hole end, and fastened by a bolt, thus achieving the quick butting of the arm body.

The present invention has the following beneficial effects.

The present invention pushes the arm body to perform pitching motion through the telescopic movement of the servo electric cylinder and the gas spring, wherein the gas spring can play a role of assisting, and balance the weight loaded on the rocker arm, so that the force exerted by the stretching and contracting of the servo electric cylinder is balanced, which has achieved the effect of balancing the longitudinal center of gravity without using a counterweight, and is convenient for use. Through the horizontal arrangement of the servo electric cylinder and the gas spring, the height of the whole device is not affected by the length of the servo electric cylinder and the gas spring itself, thus achieving the effect of compressing the whole height of the device. These and other aspects of the disclosure will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

BRIEF DESCRIPTION OF THE DRAWINGS

FIG. 18 is a structural diagram of a specific embodiment of the present invention.

Figure 1:
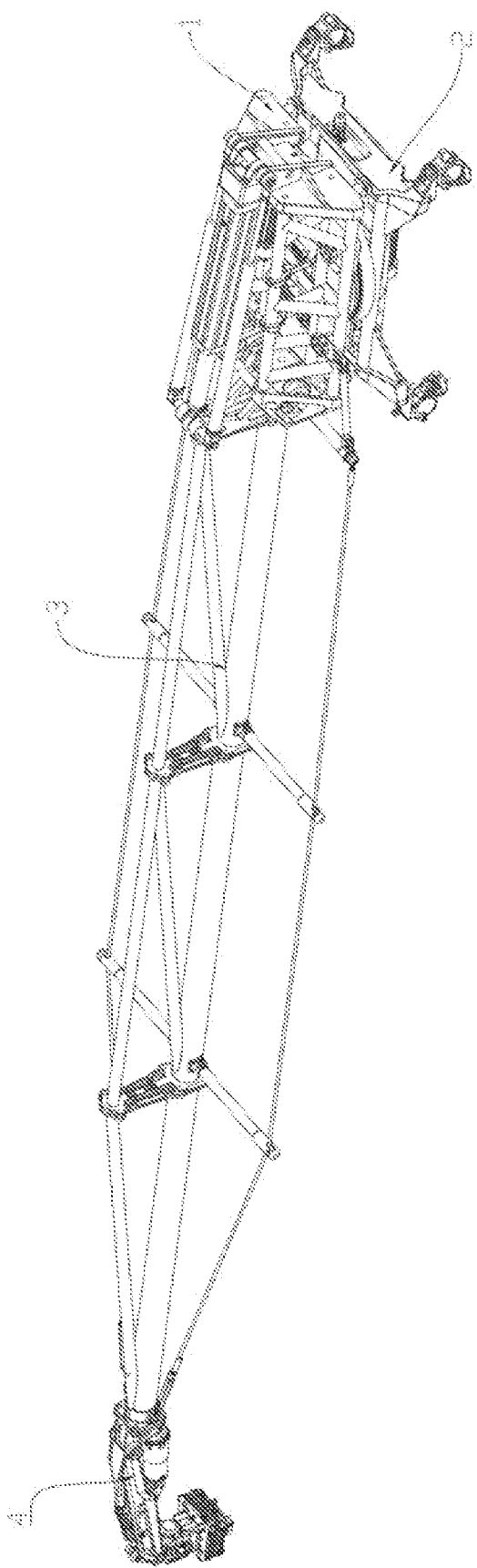
FIG. 1 is a schematic structural diagram of the present invention.

Reference numerals: 1—pitching shaft part, 2—rotating shaft part, 3—arm body part, 4—shock absorbing arm part, 5—main structure frame, 6—servo electric cylinder, 7—gas spring, 8—rocker arm, 9—quick butting plug (male) 10—positioning hole, 11—pin shaft, 12—pin shaft, 13—servo electric cylinder knuckle bearing, 14—servo electric cylinder support lug, 15—gas spring support lug, 16—air spring knuckle bearing, 17—servo motor, 18—reducer, 19—pinion, 20—gearwheel, 21—timing belt, 22—pinch roller, 23—turntable bearing, 24—butting bolt, 25—quick butting plug (female), 26—knob nut, 27—main arm tube, 28—auxiliary arm tube, 29—inclined strut, 30—steel wire rope strut, 31—arm body butting plate at a through hole end, 32—positioning pin, 33—arm body butting plate at a threaded hole end, 34—pivotal bearing, 35—base frame, 36—pitching shaft housing, 37—rotating shaft housing, 38—quick butting structure, 39—steel wire rope, 40—shock absorbing arm butting piece, 42—positioning hole, 43—shock absorber, 44—damping rod, 45—rotating damper, 46—shock absorbing plate, 47—pan-tilt camera mounting plate, 48—pan-tilt camera.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. In some practical settings, devices incorporating described aspects and features may also necessarily include additional components and features for the implementation and practice of claimed and described examples.

In order to make the object, technical schemes, and advantages of the present disclosure clearer, the present disclosure will be further described in detail with reference to the accompanying drawings and embodiments. It should be understood that the specific embodiments described here are intended for illustrating the present disclosure, but not for limiting the present disclosure.

Figure 2:
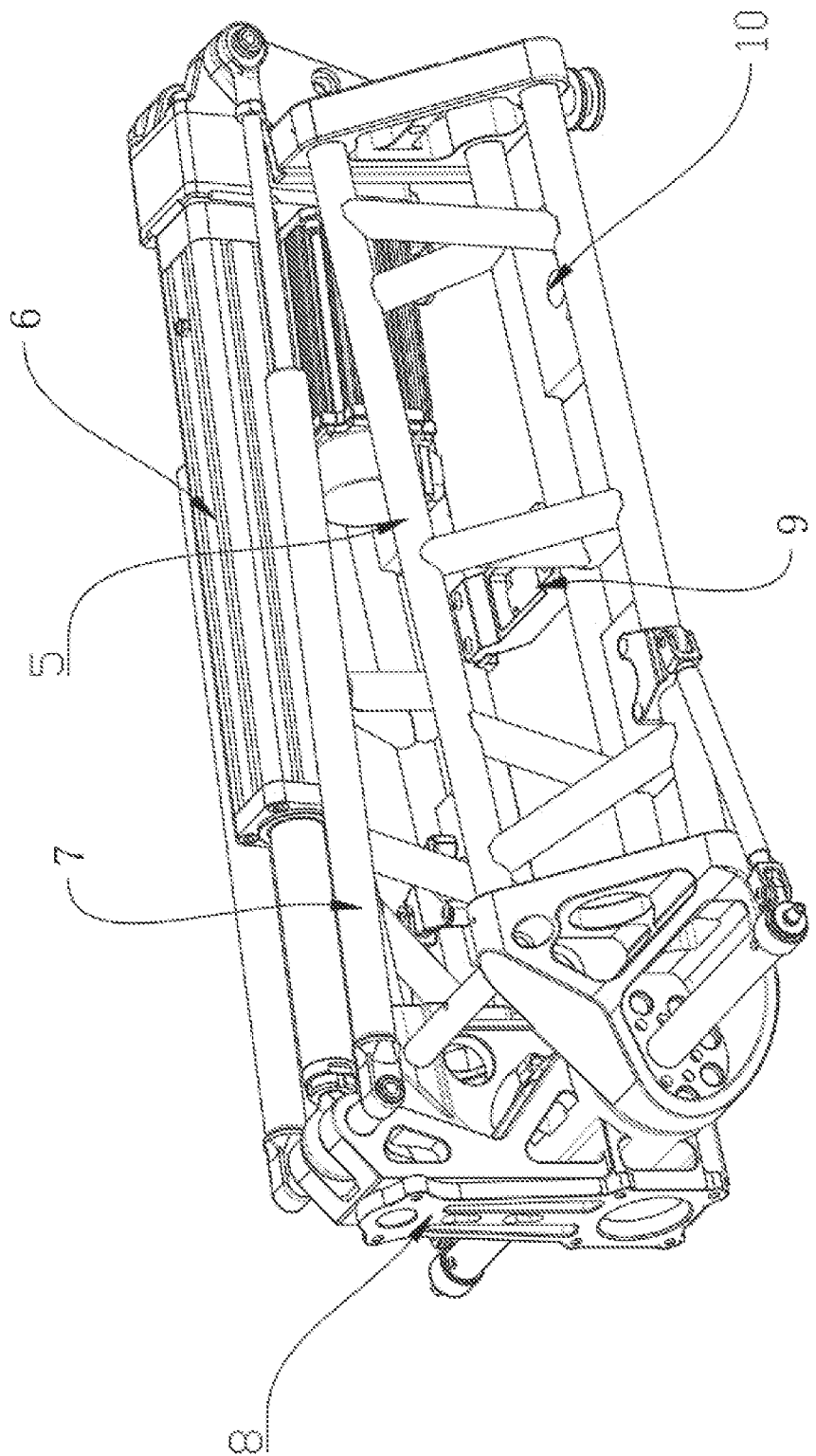
FIG. 2 is a schematic structural diagram of a pitching shaft part of the present invention.
Figure 3:
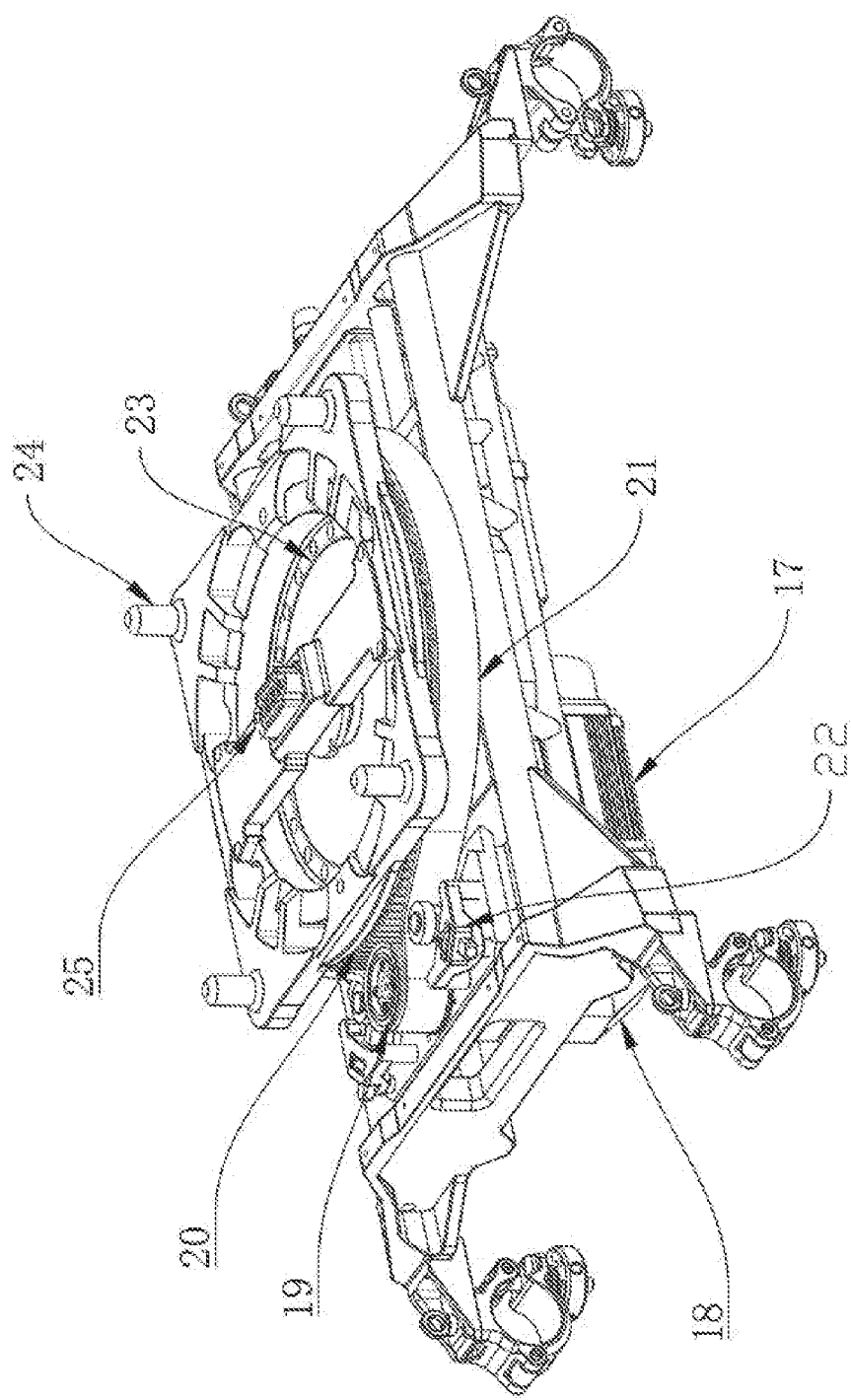
FIG. 3 is a structural diagram of a rotating shaft part of the present invention.
Figure 4:
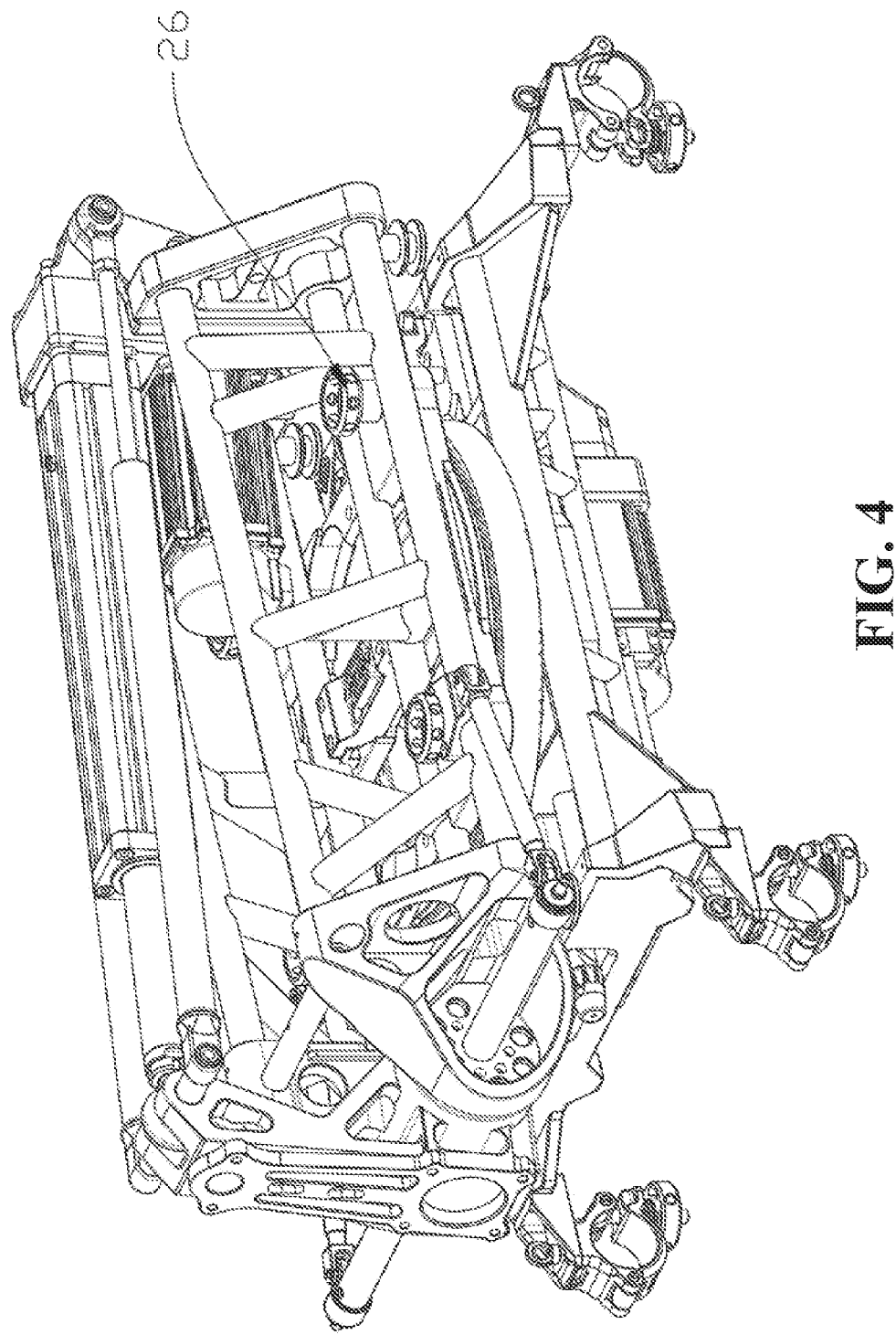
FIG. 4 is a schematic diagram of the present invention after f the pitching shaft part and the rotating shaft part are combined.
Figure 5:
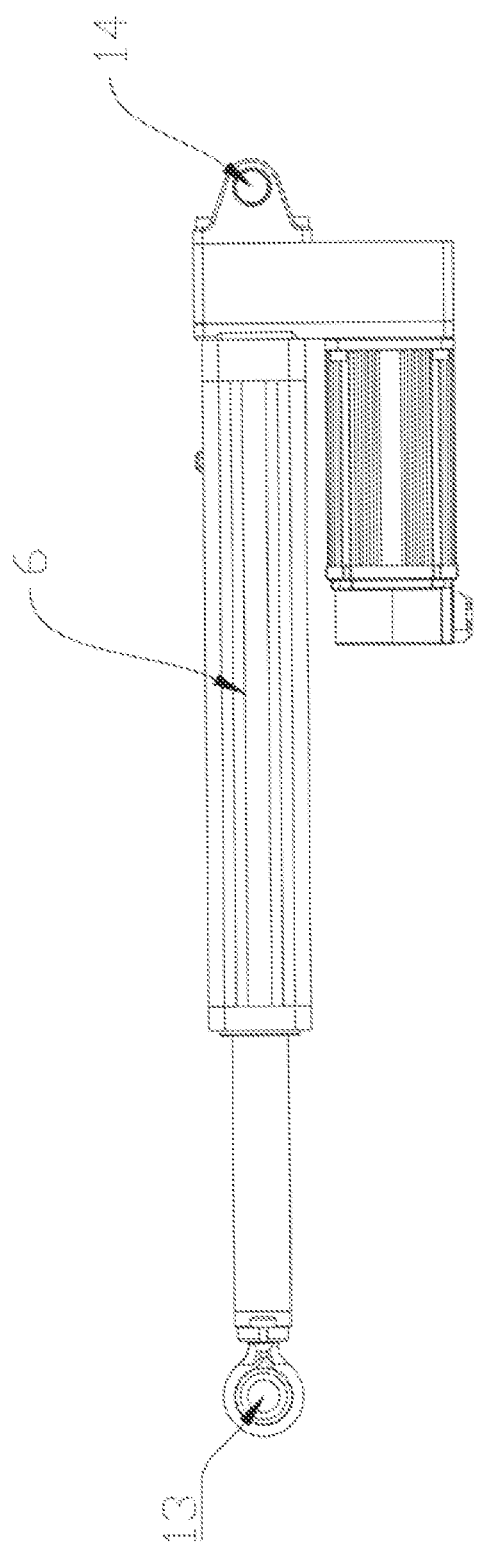
FIG. 5 is a schematic structural diagram of a servo electric cylinder of the present invention.
Figure 6:
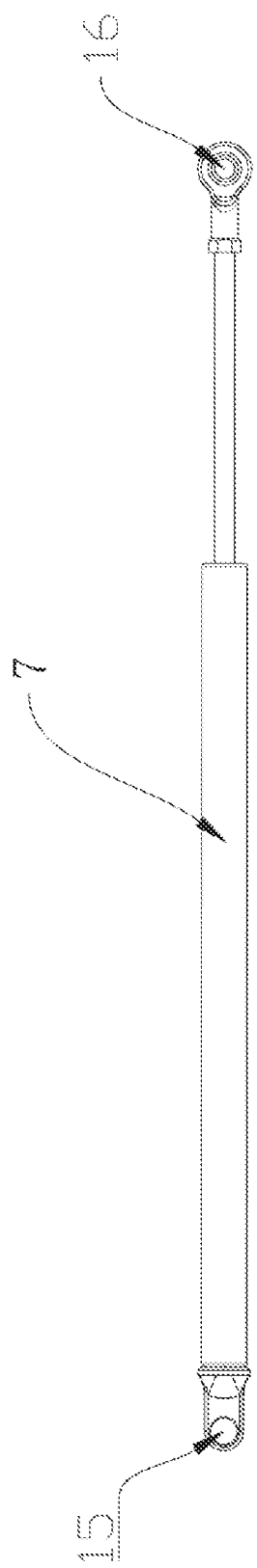
FIG. 6 is a schematic structural diagram of a gas spring of the present invention.
Figure 7:
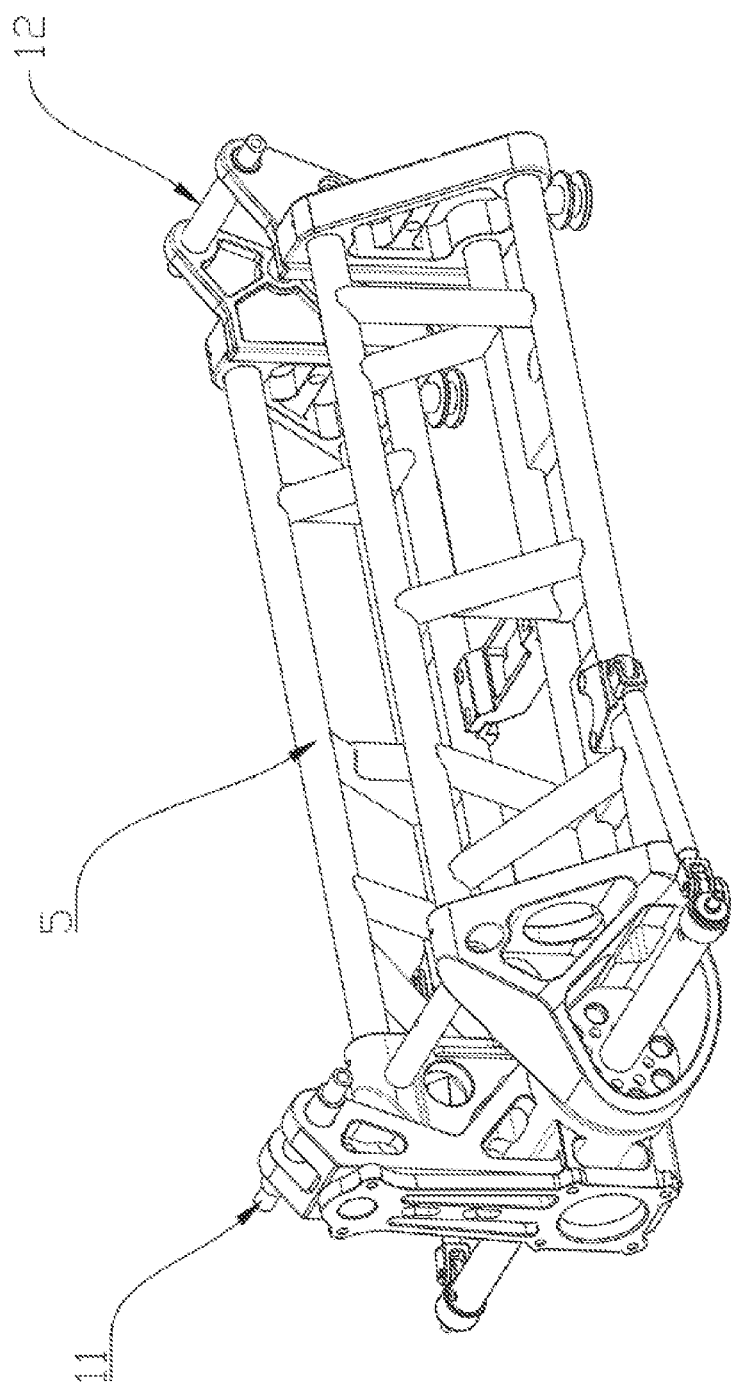
FIG. 7 is a schematic structural diagram of a main structure frame of the present invention.
Figure 8:
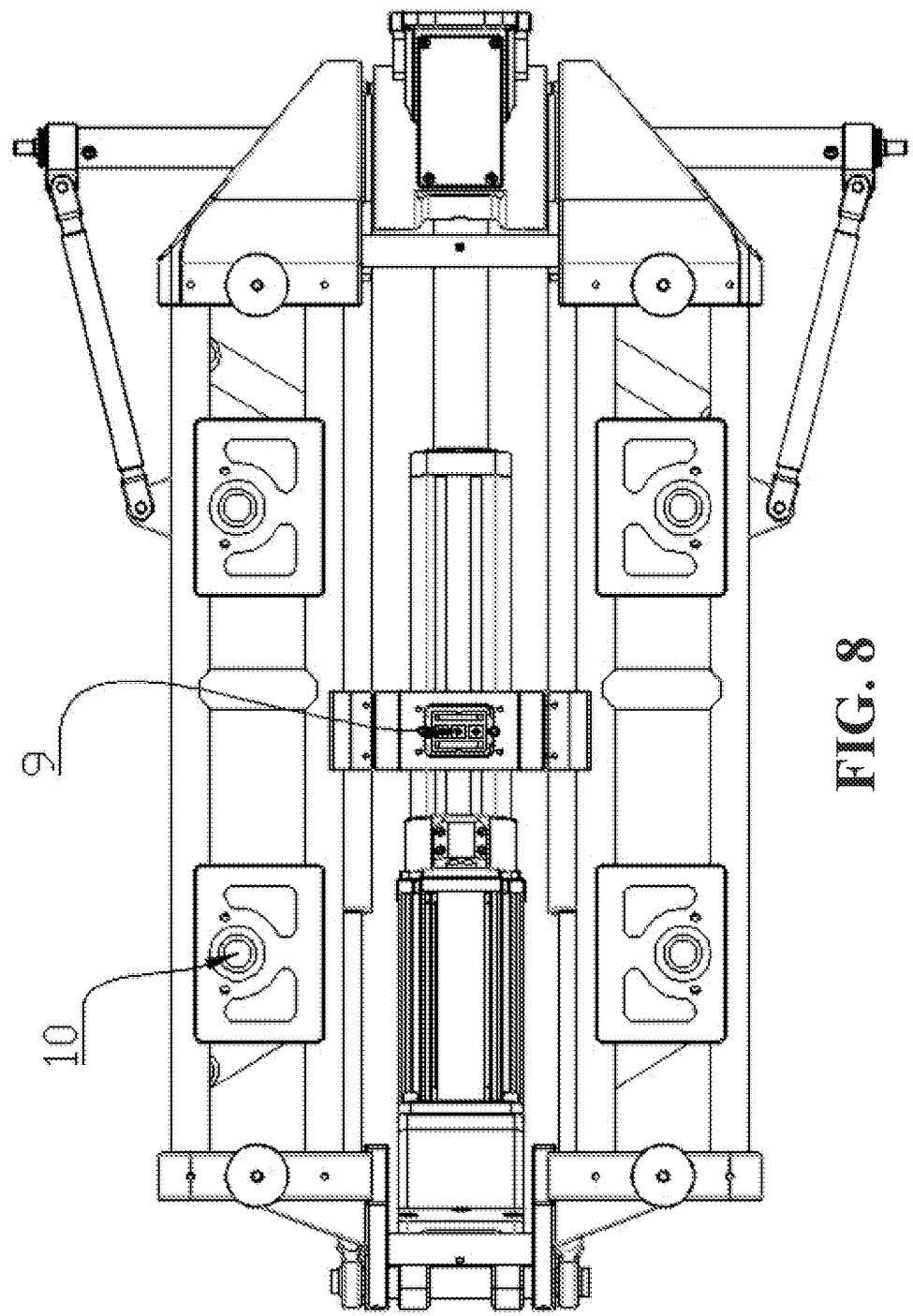
FIG. 8 is a bottom view of the pitching shaft part of the present invention.
Figure 9:
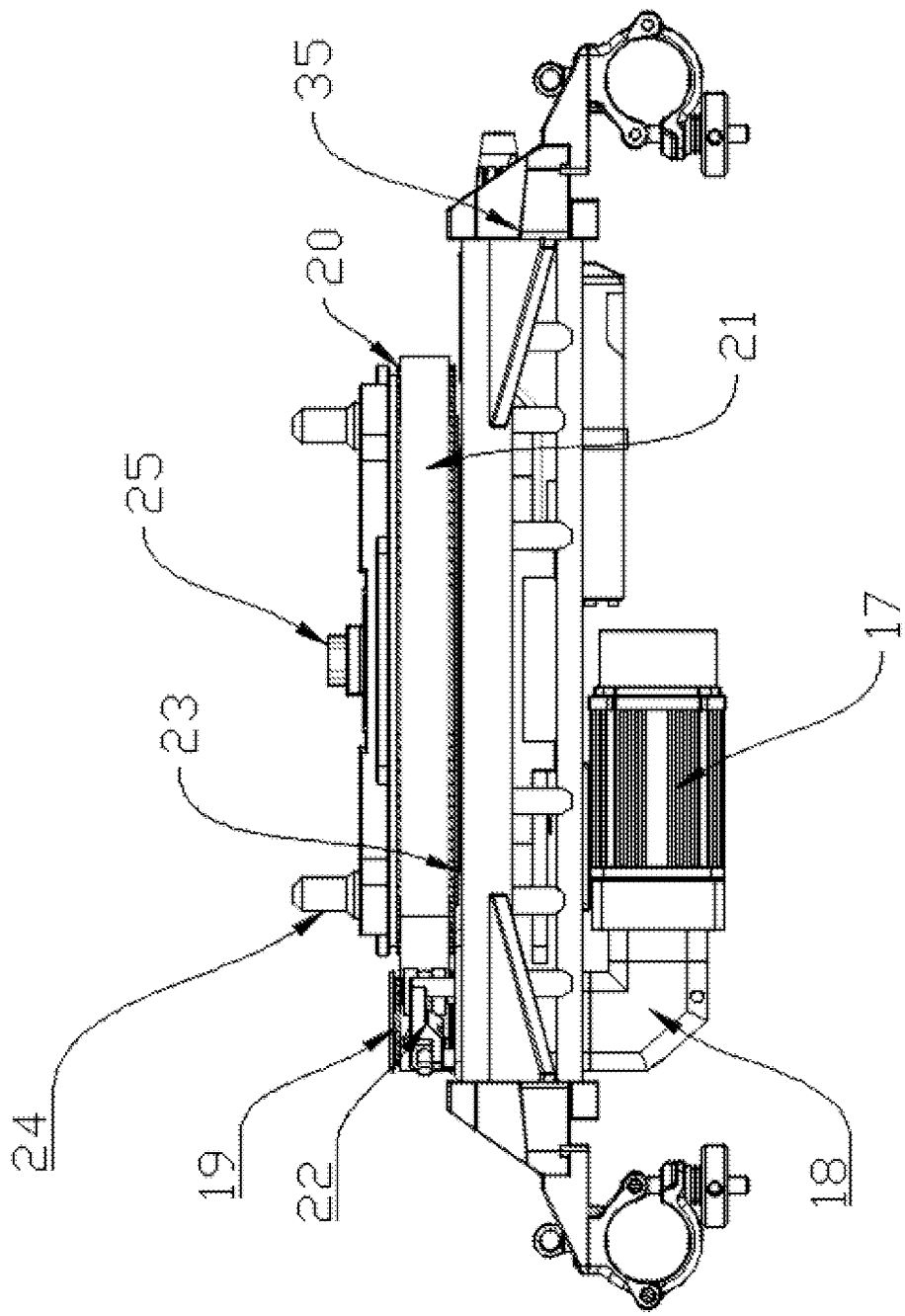
FIG. 9 is a side view of the rotating shaft part of the present invention.
Figure 10:
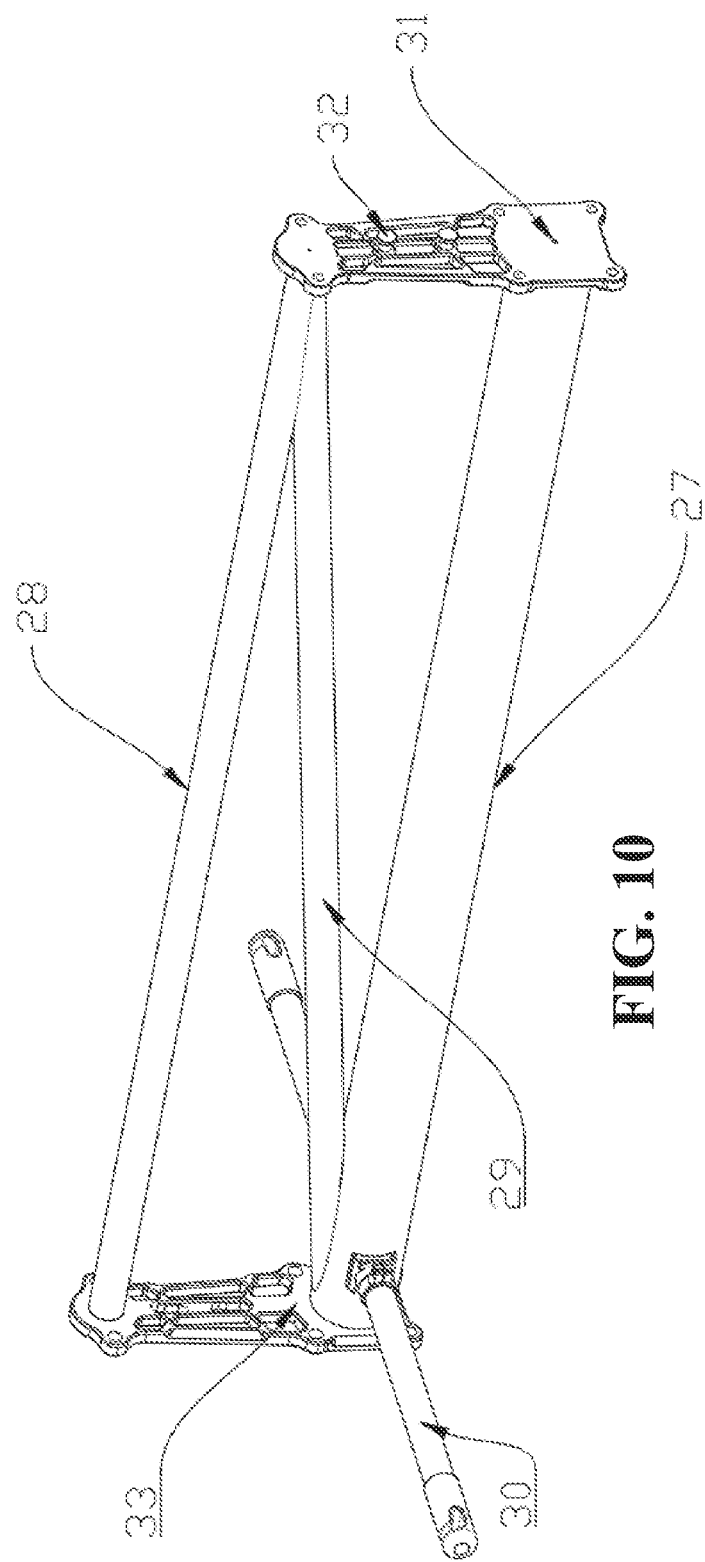
FIG. 10 is a schematic structural diagram of an arm body part of the present invention.
Figure 11:
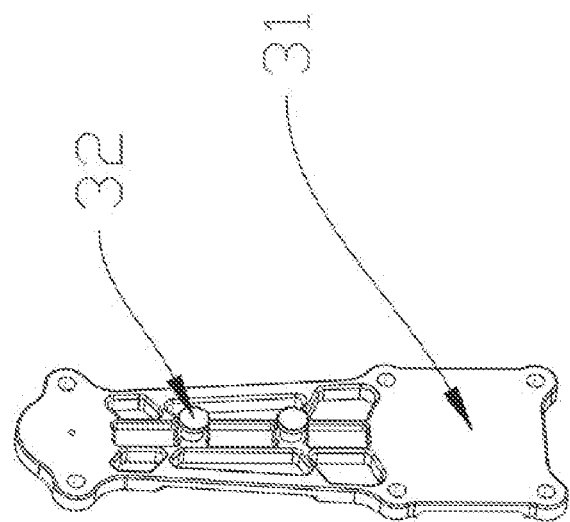
FIG. 11 is a schematic structural diagram of an arm body butting plate at a through-hole end of the present invention.
Figure 12:
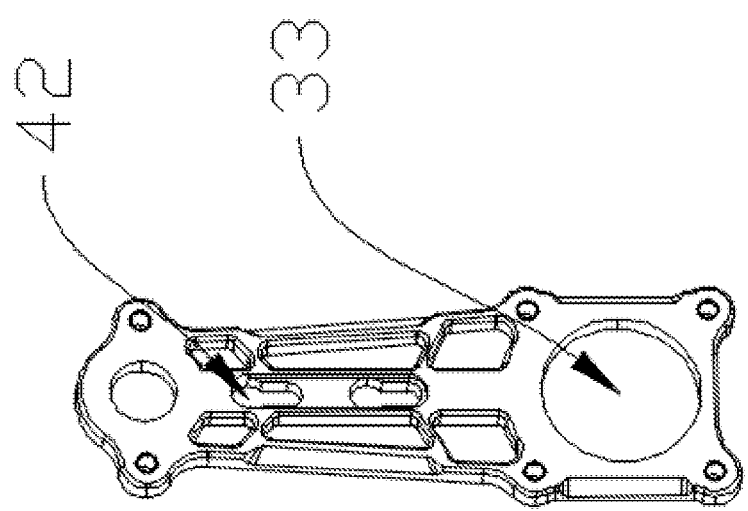
FIG. 12 is a structural schematic diagram of an arm body butting plate at a threaded hole end of the present invention.
Figure 13:
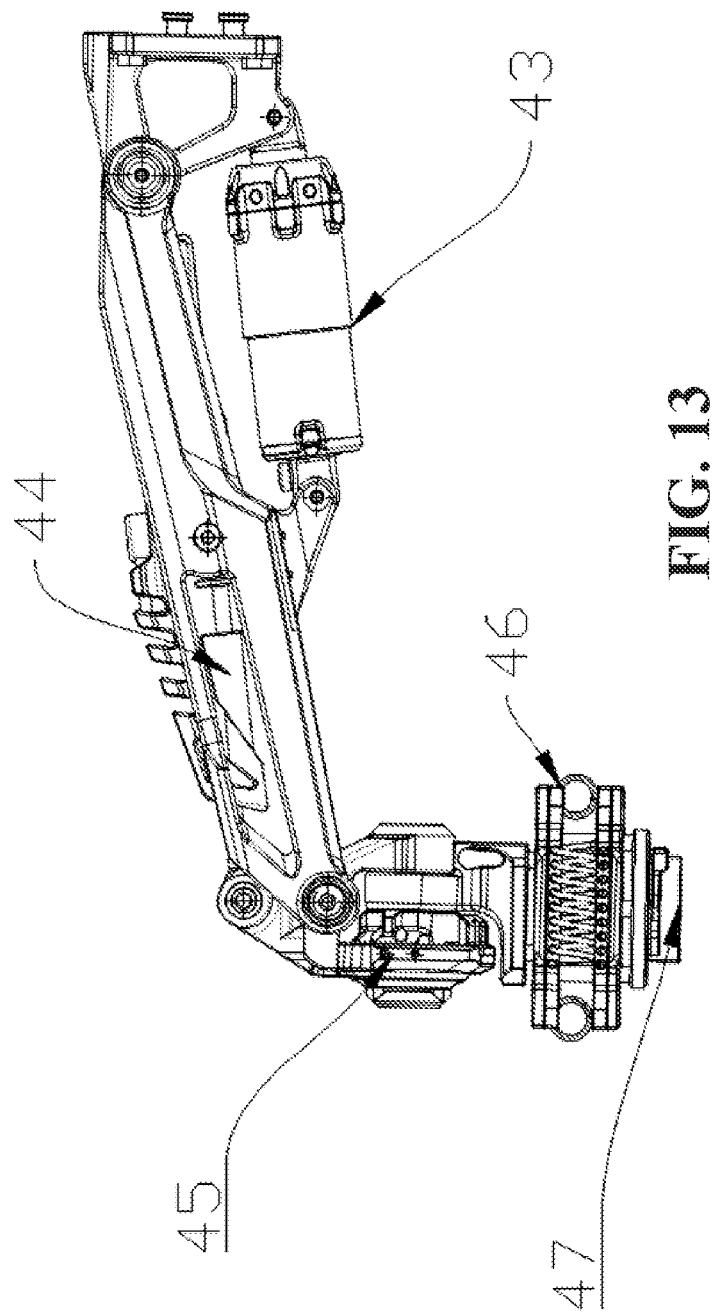
FIG. 13 is a schematic structural diagram of a shock absorbing arm part of the present invention.
Figure 14:
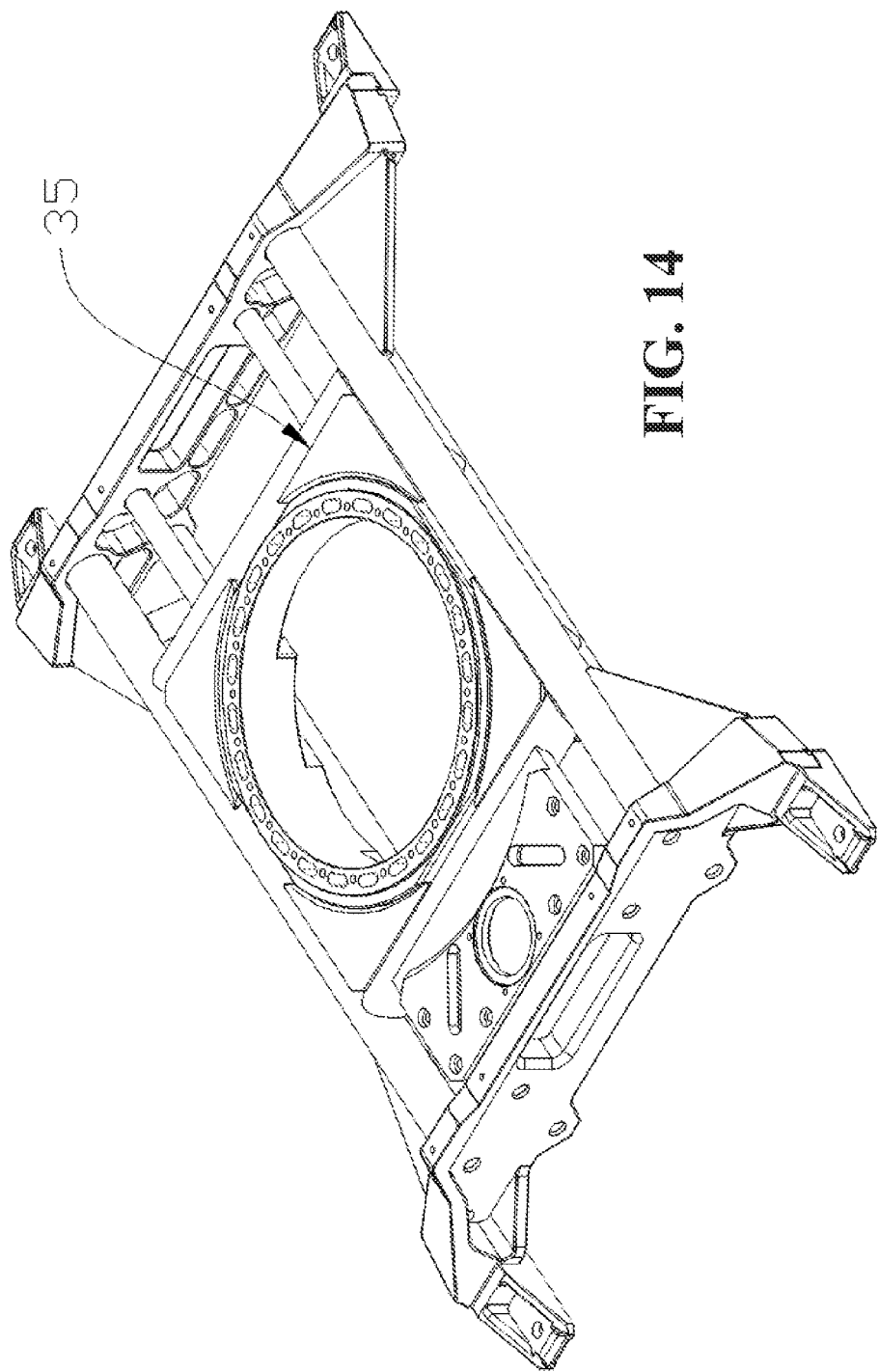
FIG. 14 is a structural diagram of a base frame part of the present invention.
Figure 15:
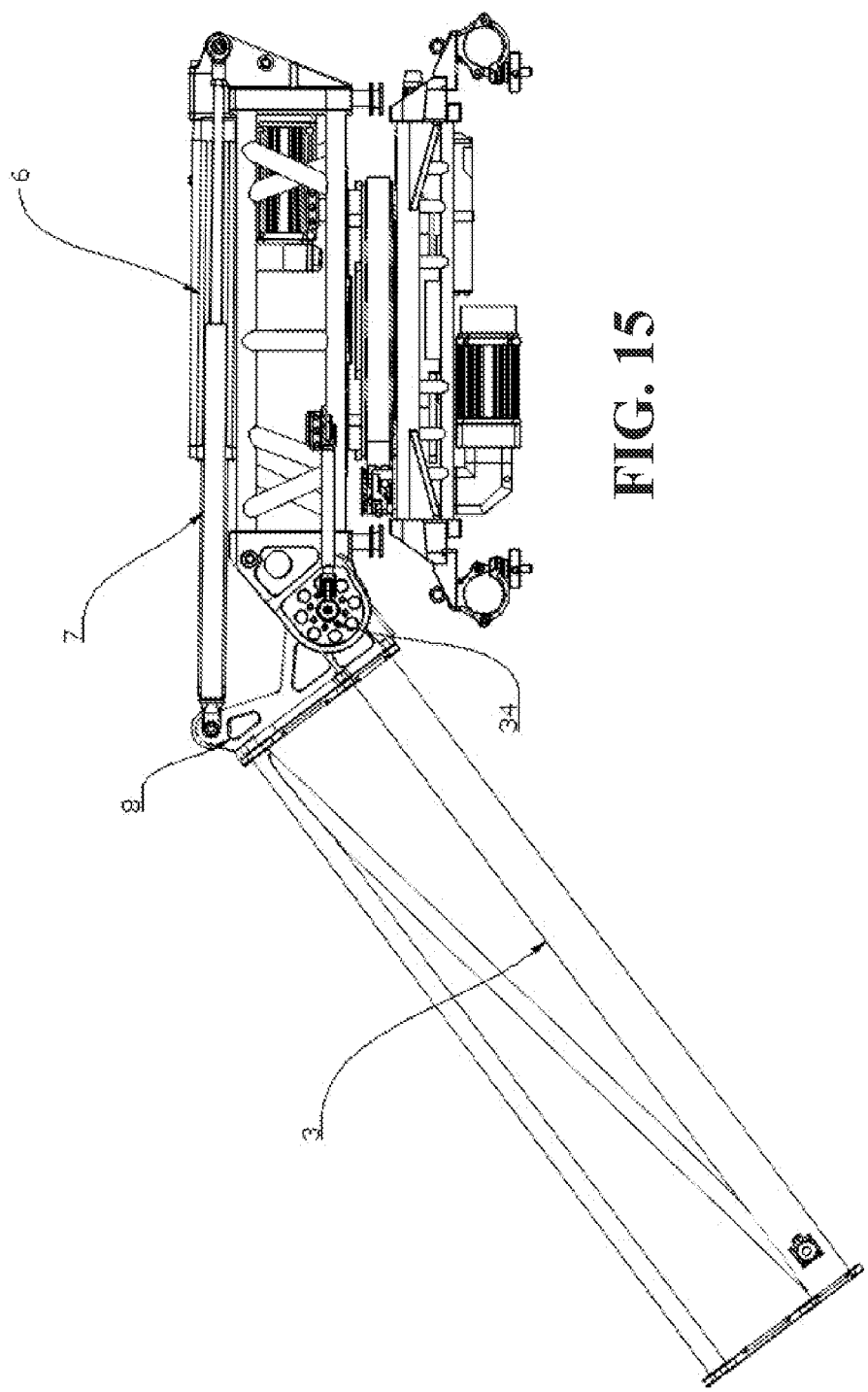
FIG. 15 is a schematic diagram of the arm body of the present invention when the arm body pitches downward.
Figure 16:
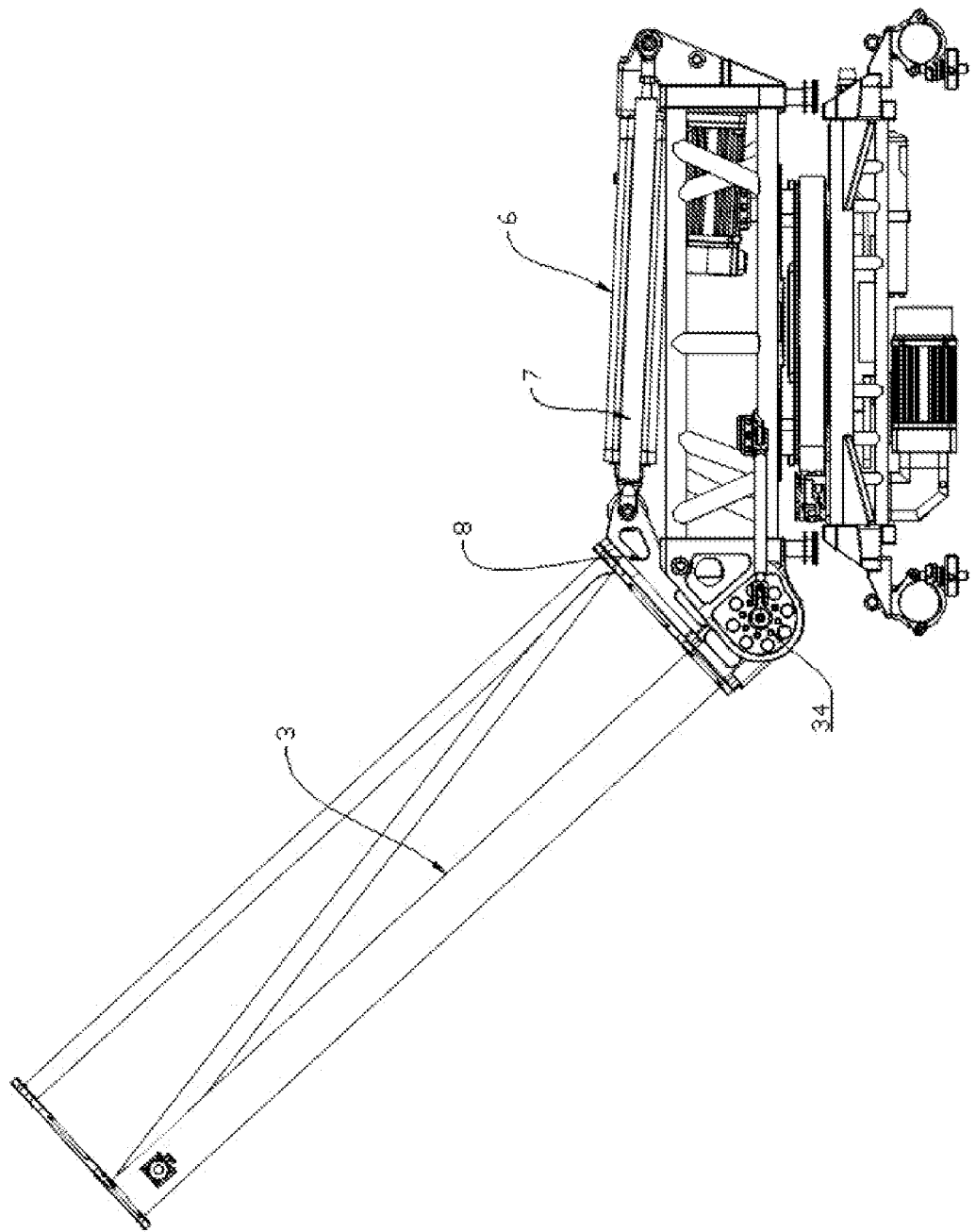
FIG. 16 is a schematic diagram of the present invention when the arm body pitches upward.
Figure 17:
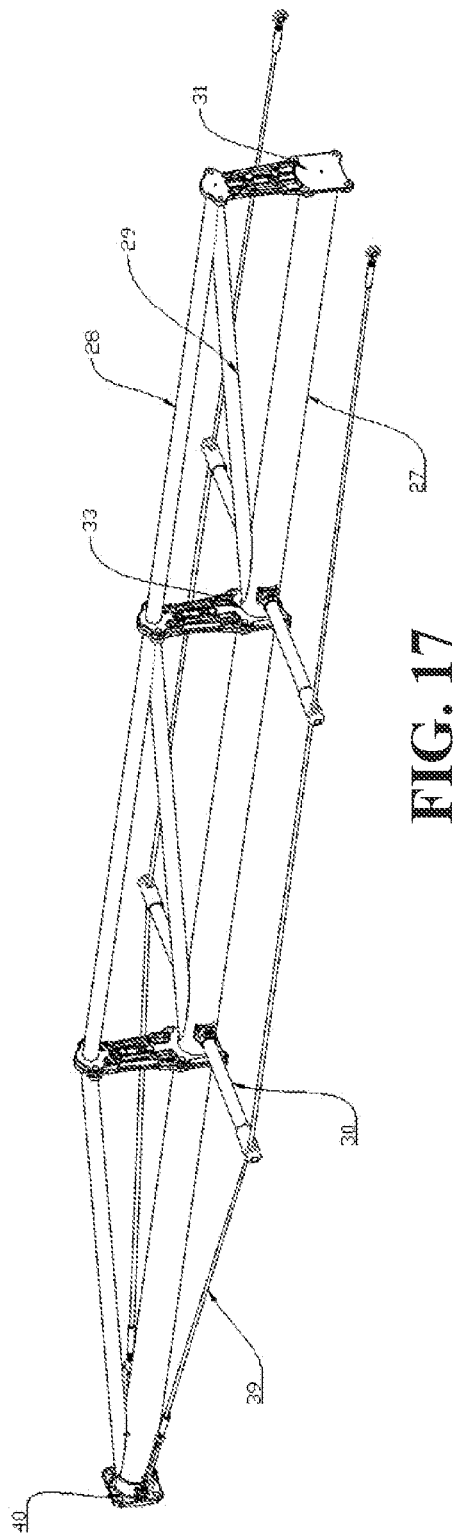
FIG. 17 is a schematic structural diagram of the arm body part of the present invention.

As shown in FIGS. 1-18, a vehicle-mounted rocker arm without counterweight includes a pitching shaft 1, a rotating shaft 2, an arm body 3, and a shock absorbing arm 4.

The pitching shaft part comprises a servo electric cylinder 6, a gas spring 7, a rocker arm 8, and a pitching shaft housing 36, which are provided on the main structure frame 5. One end of the servo cylinder 6 is connected to the rocker arm through a knuckle bearing 13, and the other end is connected to the main structure frame 5 through a support lug 14 and a pin shaft 12, and the rocker arm 8 is connected to the main structure frame 5 through a pivotal bearing 34. The servo electric cylinder 6 pushes and pulls the rocker arm 8, so that the rocker arm 8 can rotate around the pivotal bearing 34, converting the linear motion of the servo cylinder into rotating motion, and driving the arm body to perform pitching motion. A pin shaft 11 is provided on the rocker arm, both ends of the pin shaft 11 are connected to a gas spring 7, and the other end of the gas spring is provided on the main structure frame 5 through the pin shaft 12, wherein the gas spring is a reverse-stretching gas spring, which contracts when subjected to an external force and stretches after being stressed. There are two gas springs distributed on both sides of the servo electric cylinder, and inert gas is inside the gas springs, so the tension of the gas springs can be controlled by the amount of the inflated gas. The weight of the front end of the arm body 3 can be balanced by the gas spring, so that the arm body 3 will not sag under the influence of gravity even when the servo electric cylinder has no power output, so that the force of the servo electric cylinder can be reduced, the forces exerted by the servo electric cylinder in the push and pull directions are balanced, the response speed of pitching motion can be improved, the power consumption can be reduced, and the mechanical structure of the servo electric cylinder can be protected from being damaged by excessive impact force. The above-mentioned transmission structure is placed in the pitching shaft housing 36, and the pitching shaft housing can be waterproof, dustproof, and can reduce wind resistance.

The rotating shaft part 2 includes a reducer 18, a servo motor 17, a turntable bearing 23, a pinion 19, a gearwheel 20, a timing belt 21, a pinch roller 22, and a rotating shaft housing 37 which are provided on a base frame 35. The gearwheel 20 is connected to the base frame 35 through the turntable bearing 23, the gearwheel 20 is connected to the pinion 19 through the timing belt 21, and the pinion 19 is connected to the output shaft of the servo motor 17 through the reducer 18. The servo motor 17 and the reducer 18 are placed in the rotating shaft housing 37. The servo motor 17 drives the reducer 18 (for primary reduction) and the pinion 19 (for secondary reduction) to rotate. The pinion 19 drives the gearwheel 20 to rotate through the timing belt 21, and a pinch roller 22 for adjusting the tightness of the timing belt 21 is provided between the pinion and the gearwheel. The gearwheel 20 is further provided with four butting bolts 24, which can be quickly positioned and butted with the four positioning holes 10 on the pitching shaft 1, and are fastened by, for example, hand-twisted nuts. The pinion drives the pitching shaft 1 to rotate along the gearwheel 20.

A quick butting plug is further provided between the pitching shaft part 1 and the rotating shaft part 2. The quick butting plug (female) 25 is placed in the middle of the gearwheel 20, and the quick butting plug (male) 9 is placed at the bottom of the main structure frame 5 of the pitching shaft. The quick butting plug can save complicated wiring steps and achieve the quick butting of circuit communication between the pitching shaft 1 and the rotating shaft 2.

The arm body is formed by connecting three main arm tubes 27, two auxiliary arm tubes 28, three inclined struts 29, four cross bars 30, and three quick butting structures 38 by bolts, and the arm body is divided into three sections by the two quick butting structures 38. Each of two of the sections includes a main arm tube 27, an auxiliary arm tube 28, an inclined strut 29 and two cross bars 30. The other section is close to the shock absorbing arm 4, and consists of an inclined strut 29 and a main arm tube 27. The auxiliary arm tube 28 is located directly above the main arm tube 27, the two ends of the main arm tube 27 and the auxiliary arm tube 28 are connected into a whole through an arm body butting plate 33 at a threaded hole end and an arm body butting plate 31 at a through hole end, and the inclined strut 29 is supported between the main arm tube 27 and the auxiliary arm tube 28, forming a stable single-row truss structure. This structure is characterized by strong rigidity, and the whole structure will not be deformed if no one or more components are deformed when it is subjected to an external force. At the same time, rapid disassembly and assembly can be achieved. Two cross bars 30 are symmetrically provided on both sides of the main arm tube 27 and connected to the steel wire rope 39. One end of the steel wire rope 39 is connected to a shock absorbing arm butting piece 40 at the front end of the arm body 3, and the other end is connected to steel wire rope struts 41 provided on both sides of the pitching shaft 1. The function of the wire rope 39 is to improve the lateral force of the arm body, so that when the vehicle makes a big maneuver turn, the arm body will not swing left and right due to inertia.

The quick butting structure 38 includes an arm body butting plate 33 at a threaded hole end and an arm body butting plate 31 at a through hole end, wherein the arm body butting plate 31 at the through hole end is provided with six through holes and two positioning pins 32, and the threaded hole end arm body butting plate is provided with six threaded holes and two positioning holes 42 corresponding to the positioning pins 32, and the positioning pins 32 are used for connecting the two butting pieces, the arm body butting plate 31 at the through hole end and the arm body butting plate 33 at the threaded hole end before screwing, so that the screw hole position can be quickly positioned, and in addition, a protective effect is achieved, so that the arm body will not fall off even if the screw is loosened.

The shock absorbing arm part 4 includes a shock absorber 43, a damping rod 44, a rotating damper 45, a shock absorbing plate 46, and a pan-tilt camera mounting plate 47. The shock absorber 43 can eliminate the impact force caused by the up-and-down bumps when the vehicle is running, and play the role of buffering and shock absorbing. The shock absorber can adapt to different loads by adjusting the resilience and rebound speed. The damping rod 44 can absorb the swinging inertia of the pan-tilt camera in the front and rear directions caused by sudden braking or acceleration of the vehicle, and the rotating damper 45 can eliminate the swinging inertia of the pan-tilt camera in the left and right directions caused by turning of the vehicle. The damping rod 44 and the rotating damper 45 form a universal joint structure to ensure that the pan-tilt camera mounted below is always perpendicular to the ground when the rocker arm is performing pitching motion. The shock absorbing plate 46 can filter the high-frequency vibration generated during the running of the vehicle.

With the no-counterweight design, the servo electric cylinder 6 is used to provide power for the pitching shaft, and gas spring 7 plays a role of assisting, reducing the force of the servo electric cylinder 6, and it can be used without balancing the center of gravity of the arm body 3. At the same time, the overall height of the vehicle-mounted rocker arm is reduced, and the influence of obstacles over the road is eliminated when the vehicle is running. The streamlined housing is waterproof and dustproof, and at the same time, the wind resistance is reduced, and the noise and fuel consumption are reduced.

The arm body part 3, the pitching shaft part 1 and the rotating shaft part 2 all adopt a quick butting design, which is convenient for a user to disassemble, and reduces the transportation cost.

When the present invention is used, the pan-tilt camera is arranged on the pan-tilt camera mounting plate 47. When pitching, the servo electric cylinder 6 pulls the upper end of the rocker arm 8 to rotate around the pivotal bearing 34, and the arm body 3 is connected to the rocker arm 8. The rotation of the rocker arm 8 drives the pan-tilt camera to pitch, and the other end of the arm body drives the pan-tilt camera to move up and down through the shock absorbing arm 4.

When rotating, the servo motor 17 is started, the output shaft of the servo motor 17 drives the pinion 19 to rotate through the reducer 18, and the pinion 19 is connected to the gearwheel 20 through the timing belt 21, so that the pinion 19 drives the pitching shaft 1 to rotate along the gearwheel 20. The arm body 3 is connected to the pitching shaft 1, thus driving the arm body 3 to rotate, and the other end of the arm body 3 drives the pan-tilt camera to move left and right through the shock absorbing arm 4.

The above are only preferred embodiments of the present invention, and are not intended to limit the present invention. Any modification, equivalent substitution and improvement made within the spirit and principle of the present invention shall fall within the scope of protection of the present invention.

The above are only examples of the present disclosure, and are not intended to limit the present disclosure. Any modifications, equivalent replacements and improvements made within the spirit and principle of the present disclosure shall fall within the scope of protection of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A vehicle-mounted camera crane, comprising:
   a pitching shaft part;
   a rotating shaft part;
   an arm body having a first end connected to the pitching shaft part and a second end connected to a shock absorbing arm part; and
   a housing,
   wherein:
   the pitching shaft part comprises a servo electric cylinder, a gas spring, and a rocker arm provided on a main frame structure, and the servo electric cylinder is configured to drive the arm body to perform pitching motion by pushing and pulling the rocker arm; and
   the gas spring is provided between the main frame structure and the rocker arm with a first end of the gas spring connected to the rocker arm and a second end of the gas spring connected to the main frame structure, and the gas spring is configured to balance weight loaded on the rocker arm and force exerted by the servo electric cylinder without using a counterweight.

2. The vehicle-mounted camera crane according to claim 1, wherein the rotating shaft part and the pitching shaft part are independent modules, the rotating shaft part is connected to the pitching shaft part through a bolt, and a butting plug is provided between the pitching shaft part and the rotating shaft part.

3. The vehicle-mounted camera crane according to claim 2, wherein the bolt is placed on a gearwheel, a servo motor is connected to a pinion through a reducer, the pinion is connected to the gearwheel through a timing belt, and a pinch roller is provided between the gearwheel and the pinion.

4. The vehicle-mounted camera crane according to claim 1, wherein the arm body comprises a first arm body butting plate at a through hole end of the arm body and a second arm body butting plate at a threaded hole end of the arm body, a main arm tube and an auxiliary arm tube are provided between the first arm body butting plate at the through hole end and the second arm body butting plate the threaded hole end, a inclined strut is provided between the main arm tube and the auxiliary arm tube, and a positioning pin is provided on the first arm body butting plate.

5. The vehicle-mounted camera crane according to claim 1, wherein the gas spring comprises two gas springs symmetrically provided on both sides of the servo electric cylinder.

6. The vehicle-mounted camera crane according to claim 1, wherein a first end of the servo electric cylinder is fixed on a main frame structure through a pin shaft, a second end of the servo electric cylinder is fixed on the rocker arm through a pin shaft, the rocker arm is provided with a pin shaft connected to the gas spring, a first end of the gas spring is connected to the rocker arm and a second other end of the gas spring is connected to the main frame structure frame.

7. The vehicle-mounted camera crane according to claim 6, wherein the rocker arm is provided with an arm body butting plate, and the arm body is connected to the rocker arm through the arm body butting plate.

8. The vehicle-mounted camera crane according to claim 1, wherein an outer surface of the rotating shaft part and an outer surface of the pitching shaft part are provided with the housing.

9. The vehicle-mounted camera crane according to claim 1, wherein the butting plug is configured for circuit communication between the pitching shaft part and the rotating shaft part.

* * * * *